(12) United States Patent  
Chandler et al.

(10) Patent No.: US 12,467,573 B1  
(45) Date of Patent: Nov. 11, 2025

(54) PIPE LINERS, PIPE LINER COATINGS, AND ASSOCIATED METHODS

(71) Applicant: United Felts, Inc., Martinsville, VA (US)

(72) Inventors: Mark Lee Chandler, Stoneville, NC (US); Matthew Timberlake, Harrisburg, NC (US)

(73) Assignee: United Felts, Inc., Martinsville, VA (US)

( * ) Notice: Subject to any disclaimer, the term of this patent is extended or adjusted under 35 U.S.C. 154(b) by 0 days.

(21) Appl. No.: 18/956,964

(22) Filed: Nov. 22, 2024

Related U.S. Application Data

(60) Provisional application No. 63/665,112, filed on Jun. 27, 2024.

(51) Int. Cl.

| | |
|---|---|
| *F16L 55/165* | (2006.01) |
| *D06N 3/04* | (2006.01) |
| *D06N 3/12* | (2006.01) |
| *D06N 3/18* | (2006.01) |

(52) U.S. Cl.  
CPC .......... *F16L 55/1656* (2013.01); *D06N 3/045* (2013.01); *D06N 3/123* (2013.01); *D06N 3/125* (2013.01); *D06N 3/183* (2013.01); *D06N 2211/00* (2013.01)

(58) Field of Classification Search  
CPC ..... F16L 55/1656; D06N 3/183; D06N 3/045; D06N 3/123; D06N 3/125; C08J 5/18  
See application file for complete search history.

(56) References Cited

U.S. PATENT DOCUMENTS

| | | | | |
|---|---|---|---|---|
| 5,643,997 | A * | 7/1997 | Matsuoka | C08L 23/06 525/74 |
| 9,151,417 | B2 | 10/2015 | Warren | |
| 10,760,719 | B2 | 9/2020 | Fahrer | |
| 2013/0065000 | A1* | 3/2013 | Smillie | B32B 27/08 428/35.3 |
| 2014/0116566 | A1* | 5/2014 | Bader | B32B 27/08 138/140 |

(Continued)

FOREIGN PATENT DOCUMENTS

CN 108867097 * 11/2018

OTHER PUBLICATIONS

Translation of CN108867097 (Year: 2018).*

(Continued)

*Primary Examiner* — Robert C Boyle  
(74) *Attorney, Agent, or Firm* — TROUTMAN PEPPER LOCKE LLP; Christopher J. Forstner; Scott A. Bergeson

(57) ABSTRACT

Pipe liners, coating for pipe liners, methods of making, and method of installing are disclosed. One disclosed pipe liner includes a fabric sheet comprising two longitudinal edges joined together to form a longitudinally extending tube, a multi-layer coating disposed on the fabric sheet, the coating including: a first layer disposed adjacent to the fabric sheet, the first layer including about 60 percent by weight to about 80 percent by weight of a first thermoplastic and about 3 percent by weight to about 15 percent by weight of a first tie resin; a second layer disposed adjacent to the first layer, the second layer including polyamide; and a third layer disposed adjacent to the second layer, the third layer including a second thermoplastic and a second tie resin.

20 Claims, 5 Drawing Sheets

(56) References Cited

U.S. PATENT DOCUMENTS

2017/0326784 A1    11/2017  Sanders
2018/0202583 A1*  7/2018  Rimal ........................ B32B 7/12
2021/0155784 A1*  5/2021  Chang ................. C08L 23/0815

OTHER PUBLICATIONS

L.W. McKeen, 1—Introduction to Use of Plastics in Food Packaging, Editor(s): Sina Ebnesajjad, In Plastics Design Library, Plastic Films in Food Packaging, William Andrew Publishing, 2013, p. 1-15 (Year: 2013).*
EnviroCure Brochure, Styrene Barrier Coated Felt Liner, version 1 dated Jan. 21, 2021.
EnviroCure, Submittal for CIPP Lining System for Gravity Sewers and Culverts, dated May 1, 2024.
EnviroCure Felt; Technical Data Sheet, dated Jun. 17, 2024.
EnviroCure Liner, Safety Data Sheet, dated Jun. 17, 2024.

* cited by examiner

PIPE LINERS, PIPE LINER COATINGS, AND ASSOCIATED METHODS

CROSS REFERENCE TO RELATED APPLICATIONS

This application claims priority to U.S. Provisional Patent Application Ser. No. 63/665,112 filed Jun. 27, 2024, titled PIPE LINERS, PIPE LINER COATINGS, AND ASSOCIATED METHODS, the contents of which are incorporated herein by reference in its entirety.

FIELD

The present disclosure generally relates to pipe liners, pipe liner coatings, methods of making and installing. More specifically, the present disclosure relates a coating for a cure-in-place-pipe (CIPP) liner that prevents or limits styrene emissions from the pipe liner.

BACKGROUND

Over time pipes can become damaged. This damage can be in the form of cracks or breaks causing leaks or rendering a pipe structurally unsound. Since many pipes are typically underground, it can be difficult or costly to dig up the pipe and replace it without damaging or disrupting the surrounding areas above the pipe that needs replacing. As such, there is a need to avoid costly excavation cost and damage to the area near the pipe during repair with innovative and environmentally friendly solutions.

Embodiments of the present disclosure are directed to these and other considerations.

SUMMARY

Pipe liners, methods of making, and method of installing are disclosed. One disclosed pipe liner includes a fabric sheet including two longitudinal edges joined together to form a longitudinally extending tube and a multi-layer coating disposed on the fabric sheet. The coating includes a first layer disposed adjacent to the fabric sheet with the first layer including about 60 percent by weight to about 80 percent by weight of a first thermoplastic and about 3 percent by weight to about 15 percent by weight of a first tie resin. The coating may also include a second layer disposed adjacent to the first layer with the second layer including polyamide. The coating may also include a third layer disposed adjacent to the second layer with the third layer including a second thermoplastic and a second tie resin.

Another disclosed pipe liner includes a fabric sheet including two longitudinal edges joined together to form a longitudinally extending tube and a coating disposed on the fabric sheet. The coating includes about 60 percent by weight to about 80 percent by weight of a thermoplastic and about 3 percent by weight to about 15 percent by weight of a tie resin.

A piper liner coating is also disclosed. One pipe-liner coating includes a multi-layer coating for a piper liner that includes a first layer including about 60 percent by weight to about 80 percent by weight of a first thermoplastic and about 3 percent by weight to about 15 percent by weight of a first tie resin. The multi-layer coating also includes a second layer disposed adjacent to the first layer with the second layer including polyamide. The multi-layer coating also includes a third layer disposed adjacent to the second layer, the third layer comprising a second thermoplastic and a second tie resin.

A method of making one or more pipe liners is also disclosed. This method includes providing a fabric sheet, depositing a multi-layer coating on the fabric sheet by: (i) depositing a first layer adjacent to the fabric sheet, (ii) depositing a second layer adjacent to the first layer, and (iii) depositing a third layer disposed adjacent to the second layer. The first layer includes about 60 percent by weight to about 80 percent by weight of a first thermoplastic and about 3 percent by weight to about 15 percent by weight of a first tie resin. The second layer includes a polyamide. The third layer includes a second thermoplastic and a second tie resin. The method may also include aligning two longitudinal edges of the fabric sheet and multi-layer coating such that the two longitudinal edges are adjacent to one another and creating a seam between the two longitudinal edges.

The foregoing exemplifies certain aspects of the present disclosure and is not intended to be reflective of the full scope of the present disclosure. Additional features and advantages of the present disclosure are set forth in the following exemplary description, may be apparent from the description, or may be learned by practicing the present disclosure.

DETAILED DESCRIPTION

Figure 1A:
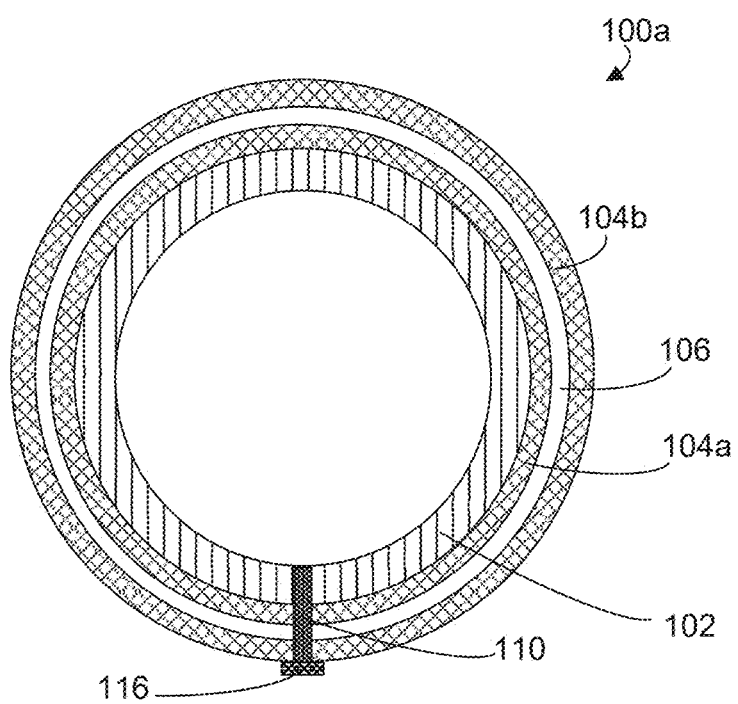
FIGS. 1A and 1B are cutaway side views of coated pipe liners, according to exemplary embodiments.

CIPP is a method of repairing damaged or deteriorated underground pipes without digging up the existing pipe. This process is completed by inserting a resin saturated substrate (e.g., felt) tube into the existing pipe and applying heat and pressure to harden the new pipe within the pipe. Styrene, a cross-linking component in both polyester and vinyl ester resins, has a distinct odor that has raised concerns amongst citizens and academic institutions related to potential health impacts associated with exposure to the compound.

To avoid potential styrene emissions, many municipalities have adopted specifications which do not allow the use of styrene-based resins in CIPP liners. Volatile organic compound (VOC)-free resins are typically more expensive and do not achieve the same strength characteristics as standard CIPP resins.

It is possible to use curing medium filtration as a solution to minimize styrene exposure to CIPP installation contractors. However, this requires the purchase of high-cost equipment and additional maintenance expenses incurred by installation contractors. Additionally, premade barrier films must be fixed upon felt substrates using various lamination techniques in a multiple-step manufacturing process.

The present disclosure details a barrier coating system that will prevent or reduce styrene migration into the curing medium (steam or hot water) thereby limiting or preventing the potential exposure of installing technicians to styrene emissions. The barrier coating system includes an extruded barrier film that will provide a means to contain emissions in existing styrene-based resin while still using traditional installation methods and materials. The barrier film is applied in a single process as a single layer film or through multiple extruders as part of a coextrusion process to create a multilayer barrier film.

In the case of a multi-layer film, the coextrusion process allows for multiple components combined into a single uniform extruded film applied directly to the surface of a substrate. The multicomponent nature of coextrusion allows for the integration of barrier polymer layer within the coating sheet. Coextrusion involves the pairing of multiple materials that lack chemical compatibility to form adequate bonding to maintain a consolidated extrusion. In this case, polyolefins are paired as the flexible component and polyamide as the barrier component for the extruded film. To bond the dissimilar materials, a specific ratio of anhydride-modified, low-density polyethylene (tie resin) is used in combination with the polyolefin or as a separate layer to link the components into a cohesive film. In some embodiments, using a specific ratio of tie resin to a thermoplastic (e.g., polyethylene) creates a uniform extrusion that will properly function in the CIPP lining process. Testing indicates the new coating blend ratio has eliminated previous failures seen in developmental iterations of this coextrusion product. Previous attempts to create a multilayer coextrusion were met with failure related to coating cracking and delamination of the individual layers at different stages of the installation and work process.

To facilitate an understanding of the principles and features of the disclosed technology, illustrative embodiments are explained below. The components described hereinafter as making up various elements of the disclosed technology are intended to be illustrative and not restrictive.

Figure 1B:
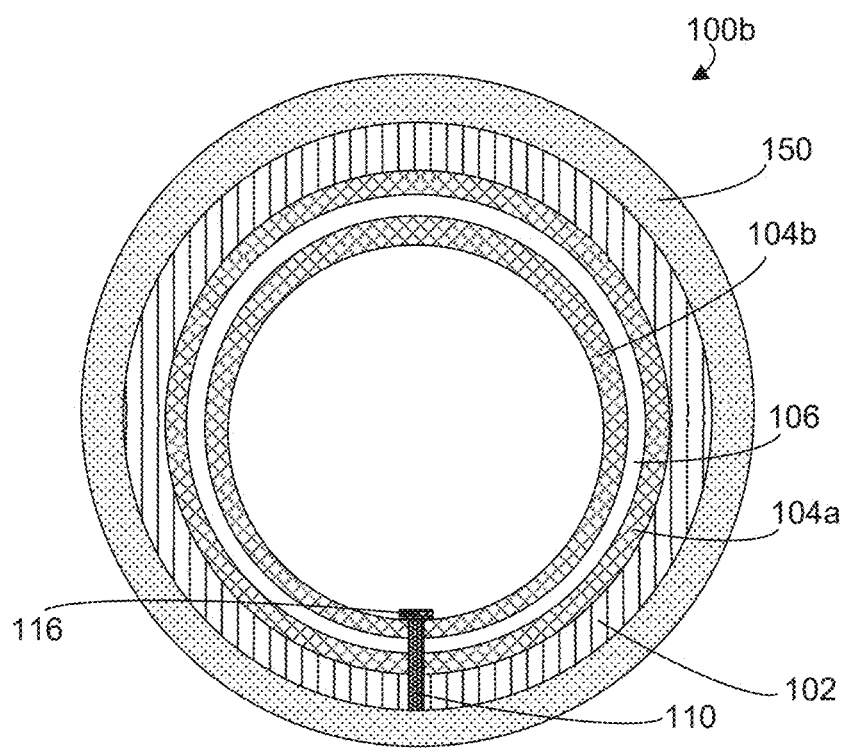

FIGS. 1A and 1B are cutaway side views of coated pipe liners, according to exemplary embodiments. FIG. 1A shows an un-inverted pipe liner 100a with a substrate 102 (e.g., fabric such as polyester felt, fiberglass, or both). A first layer 104a is disposed adjacent to and on the substrate 102. The first layer 104a includes a first thermoplastic and a first tie resin. A second layer 106 is disposed adjacent to the first layer 104a. The second layer 106 includes polyamide (e.g., nylon). A third layer is disposed adjacent to the second layer. The third layer includes a second thermoplastic and a second tie resin. Additionally, the un-inverted pipe liner 100a includes a seam 116 that covers material edges 110 of the liner.

The first layer 104a and the third layer 104b may include about 60 to about 80 percent by weight of a thermoplastic (e.g., polyethylene) and about 3 to about 15 percent by weight of a tie resin. For example, the first layer 104a and/or third layer 104b may include about 60, about 61, about 62, about 63, about 64, about 65, about 66, about 67, about 68, about 69, about 70, about 71, about 72, about 73, about 74, about 75, about 76, about 77, about 78, about 79, or about 80 percent by weight of the thermoplastic. The first layer 104a and/or third layer 104b may include about 4, about 5, about 6, about 7, about 8, about 9, about 10, about 11, about 12, about 13, about 14, or about 15 percent by weight of a tie resin.

It has been found through testing that when less than about 3 percent by weight of the tie resin is used in the first layer 104a and/or the third layer 104b, the multi-layer coating will delaminate during the installation process rupturing the styrene blocking barrier and possibly interfering with fluid flow when installed within the pipe. Similarly, it has been found through testing that when more than about 15 percent by weight of tie resin is used in the first layer 104a and/or the third layer 104b, the multi-layer coating will crack or delaminate during the installation process rupturing the styrene blocking barrier and possibly interfering with fluid flow when installed within the pipe. For example, one test found that when about 20 percent by weight of the tie resin is used in the first layer 104a and/or the third layer 104b, the multi-layer coating developed a crack extending several inches that was visible from the surface of the coating. As such, maintaining the amount of tie resin from about 3 percent by weight to about 15 percent by weight is critical. This is true for a single layer coating or any multi-layer coating including the three-layer coating discussed above or the five-layer coating discussed below with respect to FIGS. 2A and 2B.

The first thermoplastic may be polyethylene, polyethylene terephthalate (PET), or both. The first tie resin may include an anhydride-modified low-density polyethylene having a density of approximately 0.7 to 1.3 g/cm$^3$. For example, the first tie resin may have a density of about 0.7 g/cm$^3$, about 0.8 g/cm$^3$, about 0.9 g/cm$^3$, about 1.0 g/cm$^3$, about 1.1 g/cm$^3$, about 1.2 g/cm$^3$, or about 1.3 g/cm$^3$.

Figure 3A:
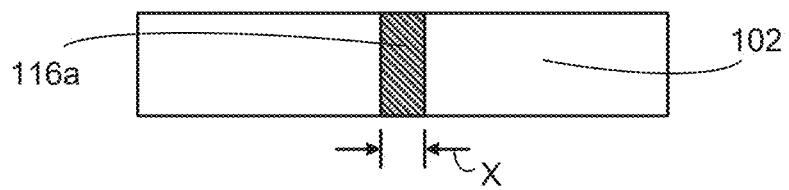
FIG. 3A is a top view of a pipe liner seam, according to exemplary embodiments.
Figure 3B:
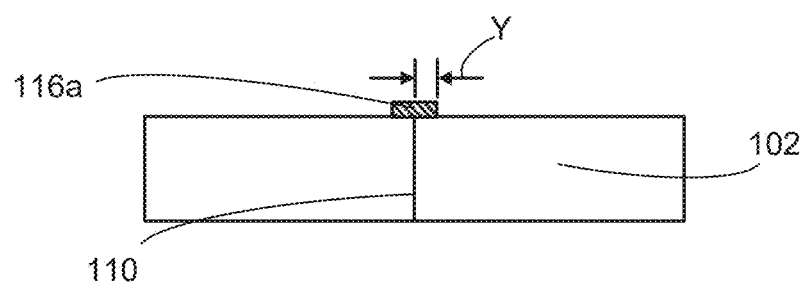
FIG. 3B is a side view of a piper liner seam, according to exemplary embodiments.
Figure 3C:
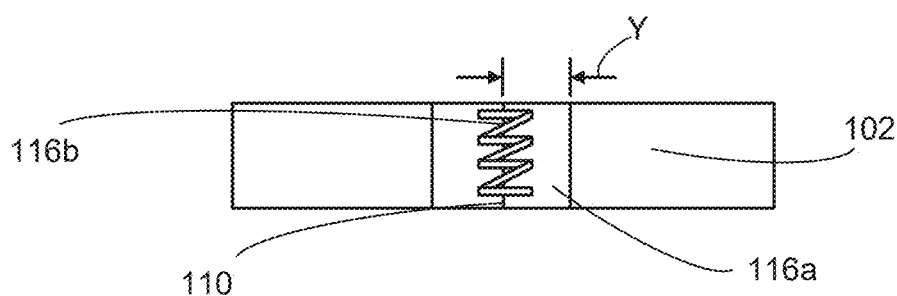
FIG. 3C is a top view of a seam, according to exemplary embodiments.

The pipe liner 100a may also include material edges 110 along with a seam 116. As shown in FIGS. 3A-3C, a pipe liner may include a seam 116a or stitching 116b formed at the material edges 110 and formed of a thermoplastic (e.g., polyethylene), tape, or stitching (e.g., polyester stitching), or a combination thereof. When a thermoplastic or tape is used, it may have a width X of about 2 inches to about 6 inches (e.g., about 4 inches) approximately centered on at the material edges 110 so that about 1 inch to about 3 inches (e.g., about 2 inches) of the thermoplastic or tape are disposed on each side of the material edges 110 as noted by the half width Y.

Referring back to FIGS. 1A and 1B, the pipe liner 100a may be inverted when installed as shown in FIG. 1B, which shows pipe liner 100b installed in pipe 150.

Figure 2A:
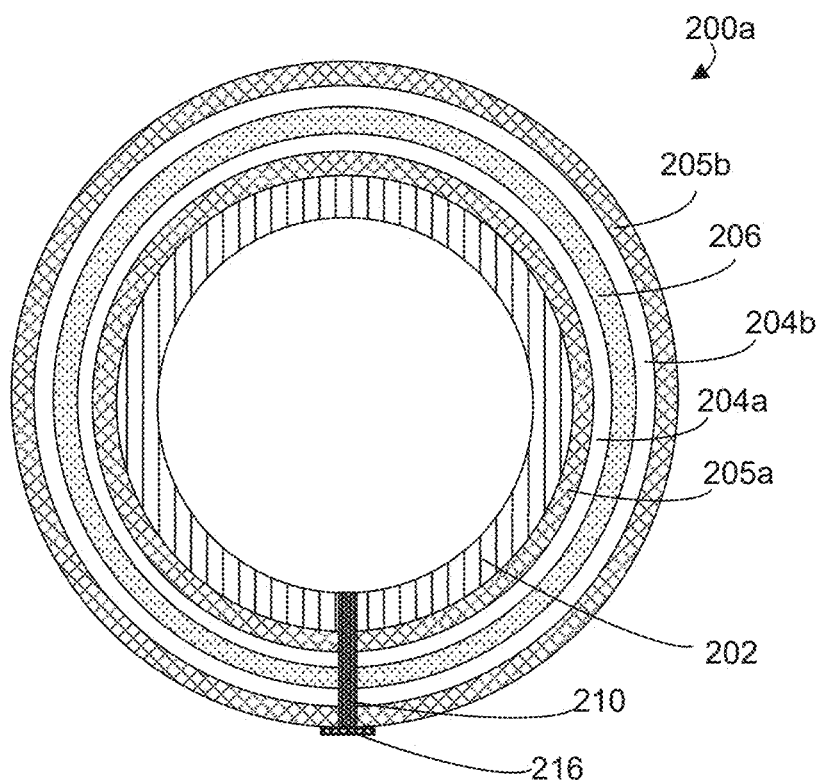
FIGS. 2A and 2B are cutaway side views of coated pipe liners, according to exemplary embodiments.
Figure 2B:
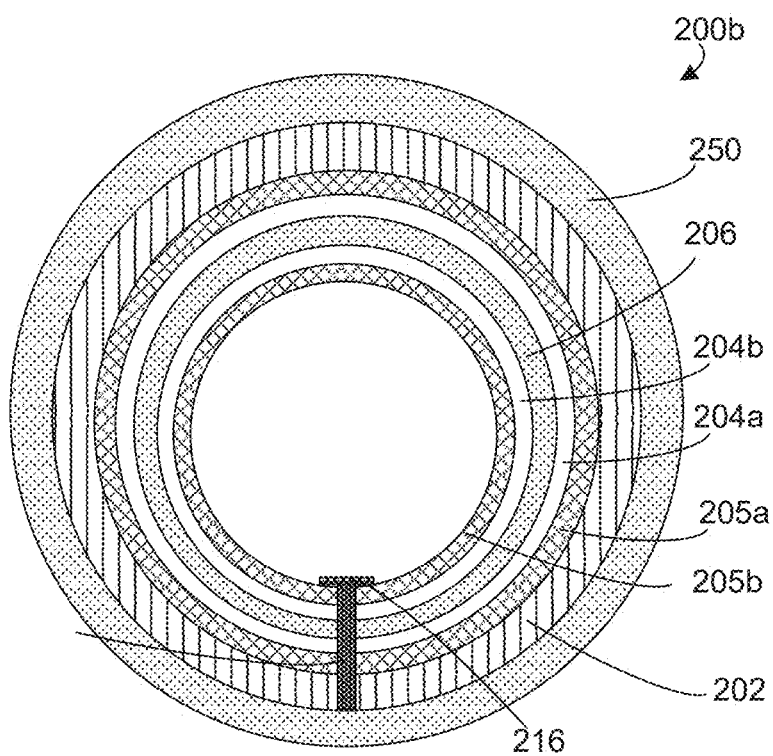

FIGS. 2A and 2B show pipe liners 200a, 200b similar to those discussed in FIGS. 1A and 1B, but with a five-layer coating. A first layer 205a or skin layer is disposed adjacent to and on the substrate 202. The first layer 205a includes a thermoplastic (e.g., a linear low-density polyethylene or an polyolefin such as a thermoplastic polyolefin (TPO)). A second layer 204a is disposed on the first layer 205a. The second layer 204a includes a first thermoplastic and a first tie resin. A third layer 206 (or core layer) is disposed adjacent to the second layer 204a. The third layer 206 includes polyamide (e.g., nylon). A fourth layer 204b is disposed on the third layer 205a and includes a second thermoplastic and a second tie resin. A fifth layer 205b (a skin layer) is disposed on the fourth layer 204b and includes a thermoplastic (e.g., a linear low-density polyethylene or a polyolefin such as a thermoplastic polyolefin (TPO)).

The second layer 204a and the fourth layer 204b may include about 60 to about 80 percent by weight of a thermoplastic (e.g., polyethylene) and about 3 to about 15 percent by weight of a tie resin. For example, the second layer 204a and/or fourth layer 204b may include about 60, about 61, about 62, about 63, about 64, about 65, about 66, about 67, about 68, about 69, about 70, about 71, about 72, about 73, about 74, about 75, about 76, about 77, about 78, about 79, or about 80 percent by weight of the thermoplastic. The second layer 204a and/or fourth layer 204b may include about 4, about 5, about 6, about 7, about 8, about 9, about 10, about 11, about 12, about 13, about 14, or about 15 percent by weight of a tie resin.

The first thermoplastic may be polyethylene, polyethylene terephthalate (PET), or both. The first tie resin may include an anhydride-modified low-density polyethylene having a density of approximately 0.7 to 1.3 g/cm$^3$. For example, the first tie resin may have a density of about 0.7 g/cm$^3$, about 0.8 g/cm$^3$, about 0.9 g/cm$^3$, about 1.0 g/cm$^3$, about 1.1 g/cm$^3$, about 1.2 g/cm$^3$, or about 1.3 g/cm$^3$.

Figure 4:
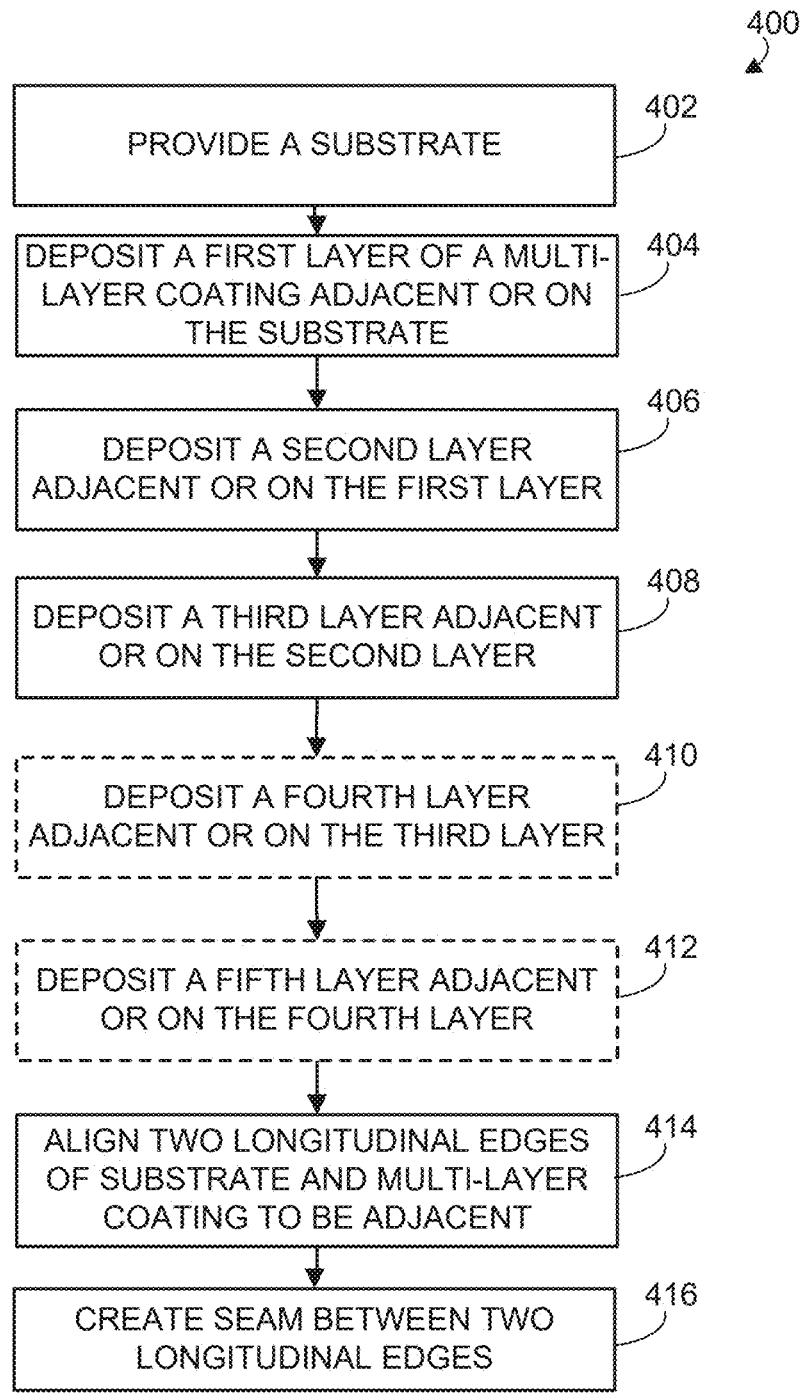
FIG. 4 is a flow chart showing a method for making a pipe liner, according to exemplary embodiments.

FIG. 4 is a method 400 for making a pipe liner 100a. The method 400 may include step 402 for providing a substrate 102 such a fabric (e.g., felt such as polyester felt) sheet. The substrate 102 can include one or more layers. Method 400 may include step 404 that includes depositing a multi-layer coating on a substrate 102 by depositing a first layer 104a adjacent to or on the substrate 102. Method 400 may include step 406 that includes depositing a second layer 106, which may include polyamide, adjacent to or on the substrate 102. Method 400 may include step 408 that include depositing a third layer 104b adjacent to or on the second layer 106. Method 400 may include step 414 that includes aligning two longitudinal edges 110 of the substrate and multi-layer coating such that the two longitudinal edges 110 are adjacent to one another. Method 400 may include step 416 that includes creating a seam between the two longitudinal edges 110.

A similar process may be used for the five-layer embodiment pipe liner 200a, except that optional steps 410 and 412 are employed. Method 400 may include providing a substrate 202 such a fabric (e.g., felt such as polyester felt) sheet in step 402. The method 400 may include depositing a multi-layer coating on a substrate 202 by depositing a first layer 205a adjacent to or on the substrate 102 in step 404. Method 400 may include depositing a second layer 204a adjacent to or on the first layer 205a in step 406. The method 400 may include depositing a third layer 206 adjacent to or on the second layer 204a in step 408. The method 400 may include depositing a fourth layer 204b adjacent to or on the third layer 206 in step 410. The method 400 may include depositing a fifth layer 205b adjacent to or on the fourth layer 204b in step 412. The method 400 may include aligning two longitudinal edges 110 of the substrate and multi-layer coating such that the two longitudinal edges 110 are adjacent to one another in step 414. Method 400 may include step 412 that includes creating a seam between the two longitudinal edges 110.

Figure 5:
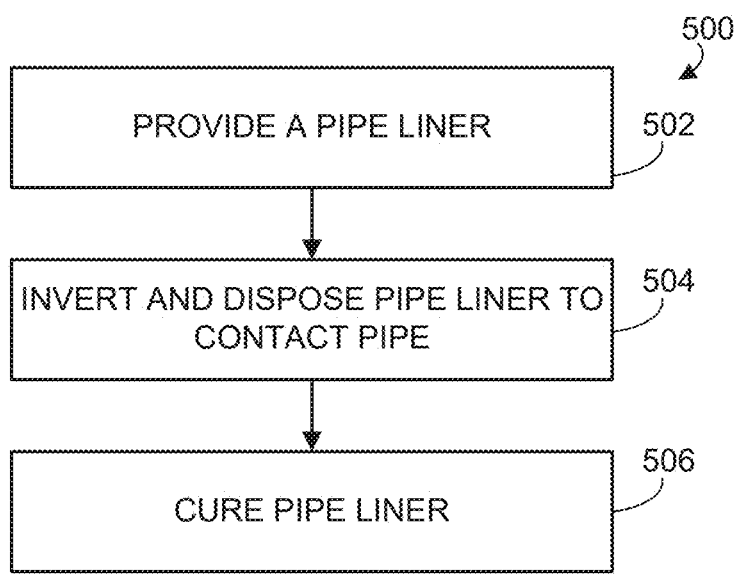
FIG. 5 is a flow chart showing a method for installing a pipe liner, according to exemplary embodiments.

FIG. 5 is a method 500 for installing a pipe liner 100b, 200b. Method 500 may include a step 502 for providing a pipe liner 100a, 200a. Method 500 may include a step 504 for inverting and disposing pipe liner 100a, 200a such that the substrate 102, 202 forms an exterior surface of the pipe liner that contacts an interior surface of a pipe 150, 250. Method 500 may include a step 506 for curing piper liner 100b, 200b in place adjacent pipe 150, 250.

Although exemplary products described herein are referred to as insulation products. The insulation products may be used for cushioning or packaging without need for thermal insulation capabilities.

Examples of the present disclosure can be implemented according to at least the following clauses:

Clause 1: A pipe liner comprising: a fabric sheet comprising two longitudinal edges joined together to form a longitudinally extending tube, a multi-layer coating disposed on the fabric sheet, the coating comprising: a first layer disposed adjacent to the fabric sheet, the first layer comprising about 60 percent by weight to about 80 percent by weight of a first thermoplastic and about 3 percent by weight to about 15 percent by weight of a first tie resin; a second layer disposed adjacent to the first layer, the second layer comprising polyamide; and a third layer disposed adjacent to the second layer, the third layer comprising a second thermoplastic and a second tie resin.

Clause 2: The pipe liner of clause 1, wherein the coating further comprises: a fourth layer disposed between the fabric sheet and the first layer, the fourth layer comprising polyethylene; and a fifth layer disposed adjacent to the third layer, the fifth layer comprising polyethylene.

Clause 3: The pipe liner of clause 2, wherein: the third layer comprise about 60 percent by weight to about 80 percent by weight of the second thermoplastic and about 3 percent by weight to about 15 percent by weight of the second tie resin, the fourth layer comprises linear low-density polyethylene, and the fifth layer comprises linear low-density polyethylene.

Clause 4: The pipe liner of clause 1, wherein the first thermoplastic comprises polyethylene, polyethylene terephthalate (PET), or both.

Clause 5: The pipe liner of clause 4, wherein the first and second tie resins comprise an anhydride-modified, low-density polyethylene having a density of approximately 0.7 to 1.3 g/cm$^3$.

Clause 6: The pipe liner of clause 1, wherein the two longitudinal edges are joined together with a weld of a layer of polyethylene formed along a length of the two longitudinal edges and the multilayer coating is disposed on the layer of polyethylene.

Clause 7: The pipe liner of clause 6, wherein the layer of polyethylene has a width of about 25 mm to about 75 mm with approximately half of the width placed on each side of the two longitudinal edges.

Clause 8: The pipe liner of clause 1, wherein the two longitudinal edges are joined together with tape, thread, ribbon, or combinations thereof.

Clause 9: A method for installing a pipe liner, comprising: providing the pipe liner of clause 1; inverting and disposing the piper liner such that the fabric sheet forms an exterior surface of the pipe liner that contacts an interior surface of a pipe; and curing the pipe liner contacting the pipe.

Clause 10: A method for installing a pipe liner, comprising: providing the pipe liner of clause 2; inverting and disposing the piper liner such that the fabric sheet forms an exterior surface of the pipe liner that contacts an interior surface of a pipe; and curing the pipe liner contacting the pipe.

Clause 11: A pipe liner, comprising: a fabric sheet comprising two longitudinal edges joined together to form a longitudinally extending tube; and a coating disposed on the fabric sheet, the coating comprising: about 60 percent by weight to about 80 percent by weight of a thermoplastic; and about 3 percent by weight to about 15 percent by weight of a tie resin.

Clause 12: A multi-layer coating for a piper liner, comprising: a first layer comprising: about 60 percent by weight to about 80 percent by weight of a first thermoplastic; and about 3 percent by weight to about 15 percent by weight of a first tie resin; and a second layer disposed adjacent to the first layer, the second layer comprising polyamide; and a third layer disposed adjacent to the second layer, the third layer comprising a second thermoplastic and a second tie resin.

Clause 13: The coating of clause 12, wherein the first thermoplastic comprises polyethylene, polyethylene terephthalate (PET), or both.

Clause 14: The coating of clause 12, wherein the first tie resin comprises an ethylene copolymer.

Clause 15: The coating of clause 14, wherein the ethylene copolymer comprises an anhydride-modified, low-density polyethylene having a density of approximately 0.7 to 1.3 g/cm$^3$.

Clause 16: The coating of clause 15, further comprising about 1 percent by weight to about 8 percent by weight of the anhydride-modified, low-density polyethylene.

Clause 17: The coating of clause 16, further comprising about 4 percent by weight or more of the polyamide.

Clause 18: A method for making a pipe liner, comprising: providing a fabric sheet; depositing a multi-layer coating on the fabric sheet by: depositing a first layer adjacent to the fabric sheet, the first layer comprising about 60 percent by weight to about 80 percent by weight of a first thermoplastic and about 3 percent by weight to about 15 percent by weight of a first tie resin; depositing a second layer adjacent to the first layer, the second layer comprising polyamide; and depositing a third layer disposed adjacent to the second layer, the third layer comprising a second thermoplastic and a second tie resin; aligning two longitudinal edges of the fabric sheet and multi-layer coating such that the two longitudinal edges are adjacent to one another; and creating a seam between the two longitudinal edges.

Clause 19: The method of clause 18, wherein the first layer, second layer, and the third layer are deposited simultaneously or near simultaneously on the fabric sheet.

Clause 20: The method of clause 18, wherein depositing the multi-layer coating further comprises: depositing a fourth layer between the fabric sheet and the first layer, the fourth layer comprising linear low-density polyethylene; and depositing a fifth layer adjacent to the third layer, the fifth layer comprising linear low-density polyethylene.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. This disclosure is intended to cover various modifications and equivalent arrangements included within the scope of the appended claims. Although specific terms are employed herein, they are used in a generic and descriptive sense only and not for purposes of limitation.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

"About" or "approximately" is used herein to mean at within 10% of the recited metric. Thus, if "about 5 percent by weight" is recited, it is intended to be inclusive of 4.5 to 5.5 percent by weight.

Dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical range and sub-range is explicitly recited. For example, a range of approximately 1 to 99.99 should be interpreted to include not only the explicitly recited limits of approximately 1 and approximately 99.99, but also individual amounts such as 2, 3, 4, 5.01, 5.02, 26, 67.1, 99.98, etc., and sub ranges such as 5 to 80 and 30.21 to 83.24, etc. Similarly, it should be understood that when numerical ranges are provided, such ranges are to be construed as providing literal support for claim limitations that only recite the lower value of the range as well as claim limitations that only recite the upper value of the range. For example, a disclosed numerical range of 5 to 15 provides literal support for a claim reciting "greater than 5" (with no upper bounds) and a claim reciting "less than 15" (with no lower bounds).

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A pipe liner comprising:
    a fabric sheet comprising two longitudinal edges joined together to form a longitudinally extending tube,
    a multilayer coating disposed on the fabric sheet, the multilayer coating comprising:
        a first layer disposed on the fabric sheet, the first layer comprising about 60 percent by weight to about 80 percent by weight of a first thermoplastic and about 3 percent by weight to about 15 percent by weight of a first tie resin;
        a second layer disposed on the first layer, the second layer comprising polyamide; and
        a third layer disposed on the second layer, the third layer comprising a second thermoplastic and a second tie resin.

2. The pipe liner of claim 1, wherein the multilayer coating further comprises:
    a fourth layer disposed between the fabric sheet and the first layer, the fourth layer comprising polyethylene; and a fifth layer disposed on the third layer, the fifth layer comprising polyethylene.

3. The pipe liner of claim 2, wherein:
the third layer comprise about 60 percent by weight to about 80 percent by weight of the second thermoplastic and about 3 percent by weight to about 15 percent by weight of the second tie resin,
the fourth layer comprises linear low-density polyethylene, and
the fifth layer comprises linear low-density polyethylene.

4. The pipe liner of claim 1, wherein the first thermoplastic comprises polyethylene, polyethylene terephthalate (PET), or both.

5. The pipe liner of claim 4, wherein the first and second tie resins comprise an anhydride-modified, low-density polyethylene having a density of approximately 0.7 to 1.3 g/cm$^3$.

6. The pipe liner of claim 1, wherein the two longitudinal edges are joined together with a weld of a layer of polyethylene formed along a length of the two longitudinal edges and the multilayer coating is disposed on the layer of polyethylene.

7. The pipe liner of claim 6, wherein the layer of polyethylene has a width of about 25 mm to about 75 mm with approximately half of the width placed on each side of the two longitudinal edges.

8. The pipe liner of claim 1, wherein the two longitudinal edges are joined together with tape, thread, ribbon, or combinations thereof.

9. A method of installation, comprising:
providing the pipe liner of claim 1;
inverting and disposing the piper liner such that the fabric sheet forms an exterior surface of the pipe liner that contacts an interior surface of a pipe; and
curing the pipe liner contacting the pipe.

10. A method of installation, comprising:
providing the pipe liner of claim 2;
inverting and disposing the piper liner such that the fabric sheet forms an exterior surface of the pipe liner that contacts an interior surface of a pipe; and
curing the pipe liner contacting the pipe.

11. A pipe liner, comprising:
a fabric sheet comprising two longitudinal edges joined together to form a longitudinally extending tube; and
a coating disposed on the fabric sheet, the coating comprising:
about 60 percent by weight to about 80 percent by weight of a thermoplastic; and
about 3 percent by weight to about 15 percent by weight of a tie resin.

12. A piper liner, comprising:
a substrate comprising two longitudinal edges joined together to form a longitudinally extending tube; and
a multilayer coating disposed on the substrate, the multilayer coating comprising:
a first layer comprising:
about 60 percent by weight to about 80 percent by weight of a first thermoplastic; and
about 3 percent by weight to about 15 percent by weight of a first tie resin; and
a second layer disposed adjacent to the first layer, the second layer comprising polyamide; and
a third layer disposed adjacent to the second layer, the third layer comprising a second thermoplastic and a second tie resin.

13. The pipe liner of claim 12, wherein the first thermoplastic comprises polyethylene, polyethylene terephthalate (PET), or both.

14. The pipe liner of claim 12, wherein the first tie resin comprises an ethylene copolymer.

15. The pipe liner of claim 14, wherein the ethylene copolymer comprises an anhydride-modified, low-density polyethylene having a density of approximately 0.7 to 1.3 g/cm$^3$.

16. The pipe liner of claim 15, further comprising about 1 percent by weight to about 8 percent by weight of the anhydride-modified, low-density polyethylene.

17. The pipe liner of claim 16, further comprising about 4 percent by weight or more of the polyamide.

18. A method for making a pipe liner, comprising:
providing a fabric sheet;
depositing a multi-layer coating on the fabric sheet by:
depositing a first layer on the fabric sheet, the first layer comprising about 60 percent by weight to about 80 percent by weight of a first thermoplastic and about 3 percent by weight to about 15 percent by weight of a first tie resin;
depositing a second layer on the first layer, the second layer comprising polyamide; and
depositing a third layer disposed on the second layer, the third layer comprising a second thermoplastic and a second tie resin;
aligning two longitudinal edges of the fabric sheet and multi-layer coating such that the two longitudinal edges are adjacent to one another; and
creating a seam between the two longitudinal edges.

19. The method of claim 18, wherein the first layer, second layer, and the third layer are deposited simultaneously or near simultaneously on the fabric sheet.

20. The method of claim 18, wherein depositing the multi-layer coating further comprises:
depositing a fourth layer between the fabric sheet and the first layer, the fourth layer comprising linear low-density polyethylene; and
depositing a fifth layer on the third layer, the fifth layer comprising linear low-density polyethylene.

* * * * *